US012067203B2

United States Patent
McCulloch et al.

(10) Patent No.: US 12,067,203 B2
(45) Date of Patent: Aug. 20, 2024

(54) TOUCH SENSOR CONTROLLER AND METHODS FOR INDICATING INTERFERENCE LEVELS

(71) Applicant: 1004335 ONTARIO INC., Ottawa (CA)

(72) Inventors: Robert Donald McCulloch, Ottawa (CA); Albert M. David, Manotick (CA); Guy Michael Amyon Farquharson Duxbury, Ottawa (CA)

(73) Assignee: 1004335 ONTARIO INC., Ottawa (CA)

( * ) Notice: Subject to any disclaimer, the term of this patent is extended or adjusted under 35 U.S.C. 154(b) by 0 days.

(21) Appl. No.: 17/663,193

(22) Filed: May 12, 2022

(65) Prior Publication Data

US 2022/0365625 A1 Nov. 17, 2022

Related U.S. Application Data (60) Provisional application No. 63/188,676, filed on May 14, 2021.

(51) Int. Cl.
*G06F 3/044* (2006.01)
*G06F 3/041* (2006.01)

(52) U.S. Cl.
CPC .......... *G06F 3/0446* (2019.05); *G06F 3/0416* (2013.01)

(58) Field of Classification Search
None
See application file for complete search history.

(56) References Cited

U.S. PATENT DOCUMENTS

| 8,723,836 B1 | 5/2014 | Shapiro et al. |
| 9,921,668 B1 | 3/2018 | Chadda et al. |
| 2013/0221993 A1 | 8/2013 | Ksondzyk et al. |
| 2016/0018921 A1* | 1/2016 | Matlick ............... G06F 3/04162 345/174 |
| 2021/0405846 A1* | 12/2021 | Feng ..................... G06F 3/0446 |

FOREIGN PATENT DOCUMENTS

| EP | 2975502 A1 | 1/2016 |

OTHER PUBLICATIONS

Combined Search and Examination Report of UK Application No. GB2206993.4, dated Feb. 10, 2023 (10 pages).

* cited by examiner

*Primary Examiner* — Stephen T. Reed
(74) *Attorney, Agent, or Firm* — Bookoff McAndrews, PLLC (57) ABSTRACT

The present disclosure provides a method for a touch sensor controller coupled to a touch sensor panel. A touch sensor system including the controller and the touch sensor panel may experience interference from various sources. The method disclosed herein includes receiving signals output from the touch sensor panel. The controller determines interference information using the signals received from the touch sensor panel. This determining includes analyzing signal levels of the signals received from the touch sensor panel. The controller generates an output indicative of the interference information.

20 Claims, 8 Drawing Sheets

TOUCH SENSOR CONTROLLER AND METHODS FOR INDICATING INTERFERENCE LEVELS

RELATED APPLICATION

The present application claims priority to U.S. Provisional Patent Application No. 63/188,676, filed on May 14, 2021, the entire contents of which are incorporated herein by reference.

FIELD OF THE DISCLOSURE

The present disclosure relates to touch sensor systems including a touch sensor and a controller coupled to the touch sensor. More particularly, the present disclosure relates to capacitive touch sensor systems that may experience interference or noise.

BACKGROUND

Touch sensor systems detect the location(s) of one or more touches on a touch sensor panel. A touch sensor system may include a touch sensor panel and a controller coupled to the touch sensor panel. The controller may receive and process signal outputs from the touch sensor panel to determine the touch location(s). Typical touch sensor systems sense touch in two dimensions (e.g. X-axis and Y-axis coordinates of a contact position). Some systems combine touch sensor capabilities with display capabilities, such as touchscreen systems.

Common types of touch sensor systems include "capacitive" touch sensor systems and "resistive" touch sensor systems. One example capacitive touch sensor system is a projected capacitive (PCAP) touch sensor system. A PCAP touch sensor panel typically comprises a two-dimensional criss-cross array of substantially transparent conductive electrodes arranged on at least one substrate layer. The electrodes may be arranged in a series of rows and columns. The rows are separated by a non-conductive layer from the columns. The non-conductive layer may be continuous or discontinuous (e.g. separated patches). A protective top layer, such as glass or plastic, will typically cover the substrate layer and the conductive strips. Electronic pulses with controlled frequency content may be input to a plurality of "transmit" electrodes of the touch sensor panel either collectively or individually. Electronics in a touch sensor controller measure signals output from "receive" electrodes of the touch sensor panel, which will be a response to the electronic impulses input to the transmit electrodes. The signals output from the touch sensor panel are affected as a function of capacitance between electrode channels of the touch sensor panel. The electrodes may be arranged as X electrode channels and Y electrode channels. Touches by a finger (or other conductive object) affect the capacitance between the shaped features (e.g. pads) of adjacent X and Y electrode channels by diverting coupling electric fields towards the effectively grounded finger. Thus, changes in capacitance of and between rows and columns due to the touches may be detected by monitoring signal output from the electrodes.

A controller for a capacitive touch sensor system may be operatively connected to a capacitive touch sensor panel. In some cases, an electronic connector, such as a "flex tail" cable may interconnect the touch sensor panel and controller. The controller may, for example, be configured to: individually and selectively drive Y electrode channels of the touch sensor; and for each driven Y electrode channel receive signals output from the X electrode channels, or vice versa. The controller may analyze the signals received from the touch sensor panel to determine location of touch events. Touch events may comprise fingers or other objects touching or almost touching (e.g. hovering over) the touch sensor panel in one or more locations. The touch sensor system may be connected to a host computing device. The host computing device may be connected to a display.

Electromagnetic Interference (EMI) and Radio Frequency interference (RFI) may increase the likelihood of detection of false touches or otherwise faulty touch detection. It may be helpful to have an indication of interference levels being experienced by the touch sensor system. When installing or integrating a touch sensor system into an environment, a technician may want to know interference levels being experienced by the touch sensor system (e.g. by the touch sensor panel, the controller, the display and/or any cables or other interconnects therebetween). EMI and RFI sources external to a touch sensor system may not be significant sources of interference. EMI and RFI signals generated locally within the touch sensor system and may typically be a more significant part of the cumulative EMI and RFI interference. The locally generated interference may be affected by details of the system design.

The technician (or another user) may need to make touch sensor system configuration decisions based on measured interference levels. Such touch sensor system configuration decisions may include, but are not limited to: position of the touch sensor panel, controller and/or display relative to other system components or other elements in the vicinity; thickness of spacer between display and touch sensor panel (to provide separation and control interference); where to run a flex tail cable, ground connections, (or other electrical connections), power supply filtering, shielding structures, and or adjust touch sensitivity, which affects glove compatibility levels. The goal for technicians installing the touch screen system may be to make ensure the touch sensor system rarely or never experiences sufficient EMI/RFI interference to generate false touches during normal operation.

Technicians may have access to a utility software tool that provides sensor system detected signal level information of signals received from the touch sensor panel. However, this approach has a number of shortcomings. For example, the technician must: a) know or be informed that the utility software exists; b) acquire the software; c) install the software on a computer (working around virus protection), which is not already be connected to the touch sensor system in some applications; d) if not already connected to the touch controller, connect the computer with the installed software to the controller; e) know that the utility software has a feature to display sensor signal levels; f) know how to use the software feature to display signal levels; and g) be able to interpret the signal level information to decide what interference levels provide satisfactory signal margin (to avoid false touches). The utility software, when in use, may also affect the EMI generated by the touch sensor system. For example, if the sensor system connection to the normal system is disrupted, the normal system may change state, and the utility software may effect processor instructions executed and their timings.

Interference may be very dependent on computer components proximate the touch sensor system, as well as activity of the touch senor system and/or other proximate computer components. Utility software that reports signal levels will need to be compatible with the operating system of the computer on which it is installed. If the host computing device of the system into which the touch sensor system is being integrated uses a different operating system than the utility software, then the touch sensor system must be connected to a different, external computer (running the utility software) for interference testing. Some touch sensor systems may not include a host computing device, thereby also necessitating connection to an external computer to run the utility software. This addition of an external computer may cause additional interference or otherwise change interference conditions. Additionally, even when running on the touch sensor system's host computing device, the software may cause different interference traits than normal operation of the touch sensor system. For at least these reasons, the use of such software may result in signal levels measured for determining interference levels not being consistent with actual interference during normal operation of the touch sensor system.

SUMMARY

According to an aspect, there is provided a method for a touch sensor controller coupled to a touch sensor panel, the method comprising: receive signals output from the touch sensor panel; determine interference information using the signals received from the touch sensor panel, comprising analyzing signal levels of the signals received from the touch sensor panel; and generating an output indicative of the interference information.

In some embodiments, the interference information comprises a quantized interference level value, and the output indicative of the interference information is generated as a function of the interference level value.

In some embodiments, determining the quantized interference level value comprises measuring, for a plurality of cells of the touch sensor panel, the signal levels of the signals received from the touch sensor panel.

In some embodiments, determining the quantized interference level value further comprises, calculating, for each cell of the plurality of cells, a respective average signal level.

In some embodiments, determining the quantized interference level value further comprises, calculating, for each cell of the plurality of cells, respective signal level deviations from the respective average signal level.

In some embodiments, determining the quantized interference level value further comprises identifying a largest signal level deviation of the signal level deviations of the cells, and generating the quantized interference level value as a function of largest signal level deviation.

In some embodiments, determining the quantized interference level value comprises measuring differences between maximum and minimum signal levels measured for at least some of a plurality of cells of the touch sensor.

In some embodiments, determining the quantized interference level value comprises generating the quantized interference level value as a function of the differences between the maximum and minimum signal levels.

In some embodiments, the method further comprises initiating an interference indication mode of operation.

In some embodiments, the method further comprises suppressing reporting of touch information during the indication mode of operation.

In some embodiments, the method further comprises receiving first input, and wherein initiating the interference indication mode of operation comprises initiating the interference indication mode of operation responsive to the first input.

In some embodiments, the method further comprises receiving second input, and ceasing the interference indication mode of operation responsive to the second input.

In some embodiments, the output indicative of the interference information comprises a visual output.

In some embodiments, the output indicative of the interference information comprises data transmitted to the host computing device.

According to another aspect, there is provided a touch sensor system comprising: a touch sensor panel; a controller coupled to the touch sensor panel and operable to perform the method(s) as described above.

According to another aspect, there is provided a controller for a touch sensor system comprising a touch sensor panel, the controller comprising: touch panel control circuitry that performs operations comprising outputting drive signals to the touch sensor panel and receives response signals output from the touch sensor panel; interference indication circuitry that performs operations comprising: determining interference information using the response signals received from the touch sensor panel, comprising analyzing signal levels of the signals received from the touch sensor panel; and generating an output indicative of the interference information.

In some embodiments, the interference information comprises a quantized interference level value, and the output indicative of the interference information is generated as a function of the interference level value.

In some embodiments, determining the quantized interference level value comprises: measuring, for a plurality of cells of the touch sensor panel, the signal levels of the signals received from the touch sensor panel; calculating, for each cell of the plurality of cells, a respective average signal level; and calculating, for each cell of the plurality of cells, respective signal level deviations from the respective average signal level.

In some embodiments, determining the quantized interference level value further comprises identifying a largest signal level deviation of the signal level deviations of the cells, and generating the quantized interference level value as a function of largest signal level deviation.

In some embodiments, the interference indication circuitry further initiates an interference indication mode of operation, and wherein the control circuitry suppresses reporting of touch information during the indication mode of operation.

Other aspects and features of the present disclosure will become apparent, to those ordinarily skilled in the art, upon review of the following description of the specific embodiments of the disclosure.

BRIEF DESCRIPTION OF THE DRAWINGS

The present disclosure will be better understood having regard to the drawings in which.

DETAILED DESCRIPTION

As explained above, there is a need for touch sensor systems with improved functionality to determine and identify interference levels. Conventional utility software that must be installed may be inconvenient to use, may require an additional external computer, and/or may increase uncertainty about the actual level of interference during normal operation of the touch sensor. Without sufficient certainty or confidence in measured interference, a technician might accept a higher than necessary risk of false touches, for example, if actual interference during normal operation is worse than measured interference. Conversely, the technician might make unnecessary integration/design compromises to a host computing device if actual interference during normal operation is less than measured interference.

The levels of interference experienced by a touch sensor system vary depending upon the activity being performed by the host computing device. To name just a few examples, a brighter display, and/or different display content may affect interference. Any other action that may be performed by the host computing device or equipment within radio range of the host computing device may affect touch sensor interference levels. It is, therefore, desirable to have a quick and easy method of testing interference, which may enable: frequent testing and identification of worst-case interference situations through simple persistence; and easier testing and recognition of activities at or near the host computing device that may affect interference levels. Testing the same breadth of conditions is less practical if a separate computer needs to be brought in and connected to the controller and run utility software.

According to aspects of the disclosure, there is provided a touch senor controller with internal interference determination and indication functionality. The need to connect the controller to separate computing device with specialized utility software may thereby be avoided. Furthermore, the controller may determine and provide overall and/or simplified interference level output (e.g. visual indication). The output may obviate the need for a technician or user to interpret signal level information in order to make determinations regarding interference. The subject matter described herein may also allow for quick, frequent and/or easy testing.

The controller of the touch sensor system may include interference indication circuitry configured to: determine an interference level as a function of signal levels of signals received from the touch sensor panel; and generate output as a function of the determined interference level. The term "circuitry" in this context refers to any combination of hardware and firmware, such as a processor coupled to a memory with instructions stored thereon for determining the interference level. The circuitry for determining interference level may include or be implemented on a touch sensor control chip of the controller, or the circuitry for determining interference level may be separate from the touch sensor control chip.

Figure 1:
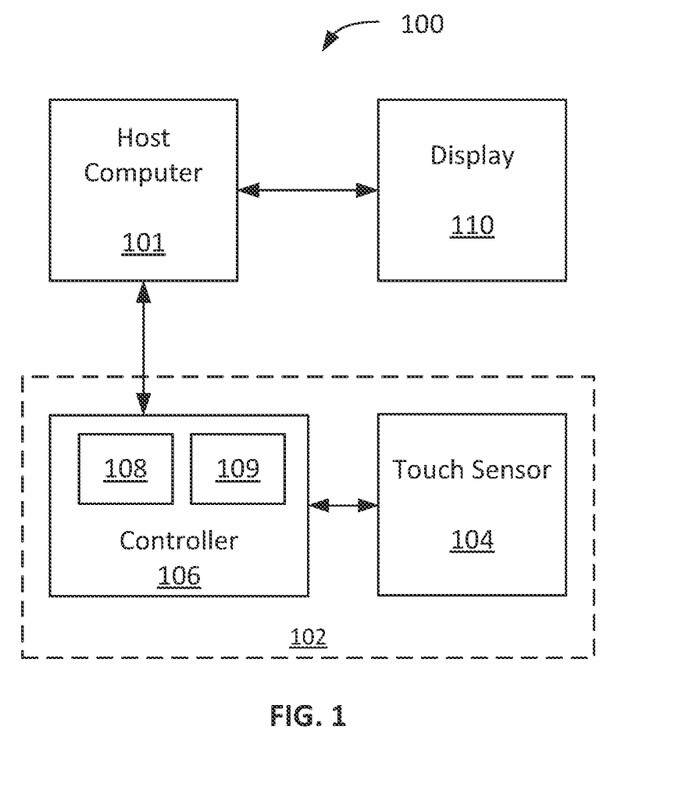
FIG. 1 is a block diagram of an example system that includes an example touch sensor system coupled to a host computing device, according to some embodiments.

FIG. 1 is a block diagram of an example system 100 that includes a touch sensor system 102 coupled to a host computing device 101. The system 100 may implement one or more embodiments described herein.

The touch sensor system 102 includes a touch sensor panel 104 coupled to a touch sensor controller 106. The controller 106 may include sensor control circuitry 108 and/or software configured to interact with and control the touch sensor panel 104. The controller 106 may also include interference indication circuitry 109 that implements other functionality described herein, such as determining and providing an indication of interference levels. The interference indication circuitry 109 may, for example, be in the form of a microprocessor that is separate from the sensor control circuitry 108. In some embodiments, the sensor control circuitry 108 and the interference indication circuitry 109 are integrated into a single microcontroller or other similar hardware unit. The sensor control circuitry 108 may be in the form a touch sensor control chip.

The controller 106 drives the touch sensor panel 104 and receives output from the touch sensor panel 104. The signals received from the touch sensor panel 104 are processed by the controller 106 to generate touch information that indicates the location(s) of touch(es) on the touch sensor panel 104. The touch sensor panel 104 may, for example, be a PCAP capacitive touch sensor with electrodes arranged in a pattern across a substrate, and the sensor control circuitry 108 may be a PCAP control chip. However, embodiments are not limited to a particular type of touch sensor or sensor control circuitry. Aspects of the disclosure may, for example, be applied to either 'mutual capacitance' or 'self capacitance' type capacitive sensors and controllers.

The host computing device 101 may be any suitable computing device capable of interacting with touch sensor system 102. The host computing device 101 is also coupled to a display 110 in this example. In some embodiments, the display 110 may be positioned under the touch sensor panel 104 such that the touch sensor system 102 and display together function as a "touchscreen." In other embodiments, the display 110 may be remote from the touch sensor panel 104. In still other embodiments, the display 110 may be omitted. The host computing device 101, the display 110, and the touch sensor system 102 may all be part of a single device, such as a mobile electronics device or machinery having a touchscreen, to name a couple of examples. In other embodiments, the display 110 may be part of the touch sensor system 102 and separate from the host computing device 101.

The host computing device 101 in this example receives input from the touch sensor system 102 in the form of touch information received from the controller 106. The host computing device 101 may also control the display 110 based, at least in part, on input received from the touch sensor system 102. For example, the display 110 may show one or more controls (e.g. buttons) that correspond to zones (or regions) of the touch sensor panel 104. Touch events located within those zones may activate the one or more controls accordingly. A variety of functionality may be implemented by the touch sensor system 102, host computing device 101 and display 110, and embodiments are not limited to any particular purpose or use of the system 100 or other similar systems. The term "host computing device" may refer to any electronic processing device capable of interfacing a touch sensor system to receive touch information including, but not limited to: mobile electronic device;

a client computer; a microcontroller; or any other device having circuitry for interfacing with a touch sensor controller.

Figure 2:
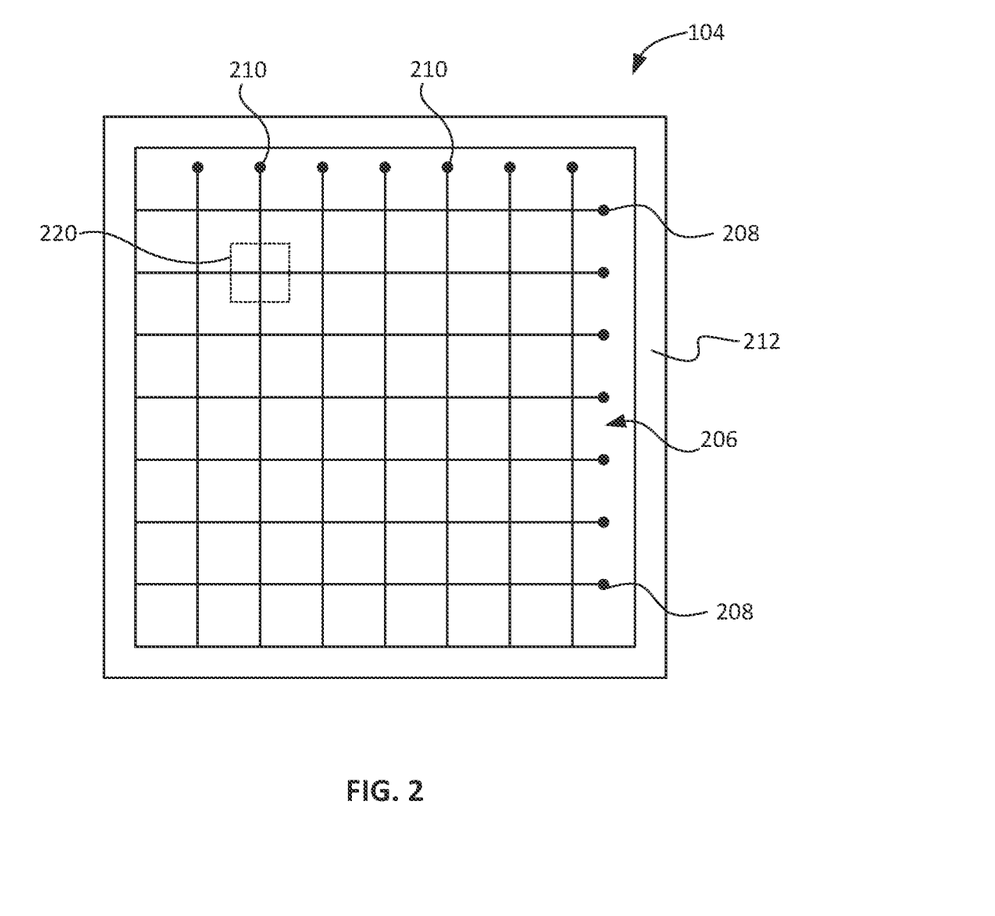
FIG. 2 is a schematic diagram showing additional details of an example implementation of a touch sensor panel.

FIG. 2 is a schematic diagram showing additional detail of an example implementation of the touch sensor panel 104. Embodiments are not limited to this example touch sensor panel 104. The touch sensor panel 104 includes sensor area 206 formed by a planar substrate having a plurality of "Y electrode channels" 208 and a plurality of "X electrode channels" 210 arranged thereon. The Y electrode channels 208 may be referred to as "horizontal channels" or "rows." The X electrode channels 210 may be referred to as "vertical channels" or "columns." The number and spacing of the Y electrode channels 208 and X electrode channels 210 may vary. The number of the Y electrode channels 208 and X electrode channels 210 may be referred to herein as the "size" of the touch sensor panel 104. Spacing between the Y electrode channels 208 and X electrode channels 210 corresponds to a "pitch" of the touch sensor panel 104. The actual physical sensing area of the touch sensor panel 104 will be a function of the size and pitch. The X and Y electrode channels 208 and 210 of the touch sensor panel 104 may form a matrix with "cells," where each cell is an area corresponding to at least one crossover of X and Y electrodes. In FIG. 2, a portion of the touch sensor panel 104 corresponding to a crossover of Y electrode channel 208 row and X electrode channel 210 may be referred to herein as a "cell". One example cell is approximately indicated by the box 220 shown with stippled lines (though the size and shape of cells may vary on the configuration of the electrodes of the X and Y electrode channels 210 and 208. Each other crossover may be associated with a corresponding cell. Some examples of electrode configurations are shown and described in U.S. patent application Ser. No. 11/112,922, the entire contents of which are incorporated by reference.

The Y electrode channels 208 and X electrode channels 210 may be connected to various circuitry (not shown) within a bezel 112 that typically extends around a periphery of the touch sensor area 206. In other embodiments, a touch sensor may not include a bezel or only have a small bezel, and at least some circuitry of the touch sensor may instead be located behind the substrate or elsewhere.

Figure 3:
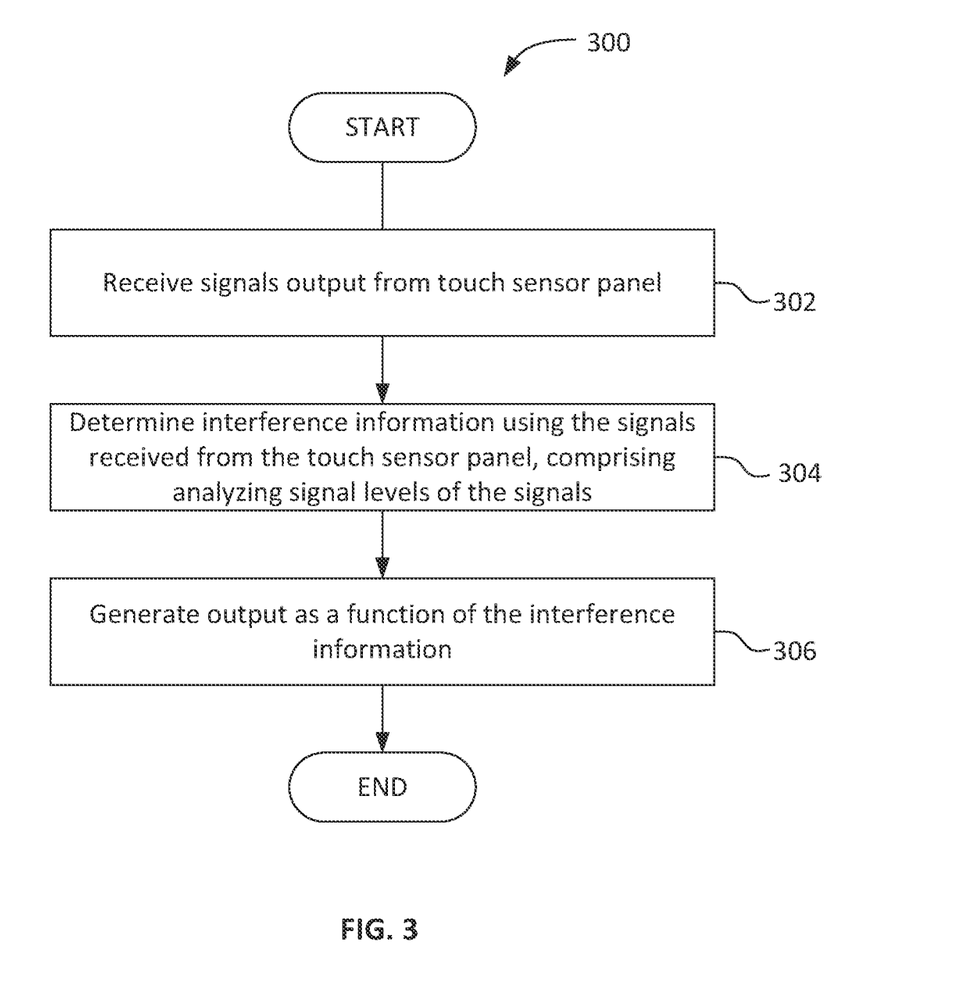
FIG. 3 is a flow diagram of an example method that may be performed by a touch sensor controller according to some embodiments.

FIG. 3 is a flow diagram of an example method 300 that may be performed by a touch sensor controller, such as the controller 106 in FIG. 1. For example, the method 300 may be implemented by the interference indication circuitry 109 of the controller 106. The method 300 will be described below as performed by the controller 106 in the system 100 by way of example. However, embodiments are not limited to the particular system 100 or touch sensor controller 106 of FIG. 1. As noted above, for normal operation, the controller 106 may drive the touch sensor panel 104 with drive signals, and the signals output from the touch sensor panel 104 may be analyzed by the controller 106 to determine touch information (e.g. location(s) of one or more touches). According to the methods described herein, the signals output from the touch sensor panel 104 may be used by the controller to determine interference information.

At block 302, the controller 106 receives signals output from the touch sensor panel 104. The signals output by the touch sensor panel 104 may be responses to the drive signals output by the controller 106 to the touch sensor panel 104. These signals may be received over repeated "frames" (also referred to as "frame reads" or "scans") of the touch sensor panel. Each "frame" or "scan" may comprise the controller outputting a series of drive signals input to the touch sensor panel 104 and receiving and analyzing the resulting signals output by the touch sensor panel 104. Each frame may yield signal measurements for most or all of the cells of the touch panel. The drive signals may be directed to a first set of channels (e.g. X electrode channels) and resulting signals output by the touch sensor may be output from a second set of channels (e.g. Y electrode channels), or vice versa. Signals received from the touch sensor panel, corresponding to each cell of the touch sensor panel 104, may thereby be received and analyzed. Embodiments are not limited to a particular number of frame reads, or to particular set of driven channels or channels providing output.

At block 304, the controller determines interference information using the signals received from the touch sensor panel 104. This determination comprises analyzing signal levels of the signals received from the touch sensor panel 104. The algorithm for analyzing the signal levels and determining interference information may vary, and some example algorithms are described below.

The term "signal levels" may refer to voltage levels of signals (e.g. pulses) or changes in voltage levels of the signals received from the touch panel receive electrodes. However, the "signal levels" may refer to other signal characteristics indicative of touch (or extent of touch) such as slope or changes in slope. For example, where the drive signals input to the touch sensor panel 104 are short pulses, the controller 106 may measure changes in slopes of edges of pulses received back from the touch sensor panel 104. The changes in slopes may be converted to digital signal level data.

The interference information may comprise an interference level value, which may be quantified on a simple numeric scale. The interference level value may indicate whether, or by how much, the interference level is comfortably below problem levels.

At block 306, the controller 106 generates an output as a function of the interference information. The output may indicate an interference level. Generating the output may comprise comparing the interference level value to an 'interference threshold' value. If the interference level value is sufficiently below the interference threshold value, then the output may indicate that interference is at a safe level. If the interference level value is above the interference threshold value, then the output may indicate that interference is at an unsafe level. Multiple thresholds and/or a sliding scale may be used to provide output according to multiple tiers of concern (e.g. "safe", "caution", "danger", etc.). Generating the output may comprise providing a visual indicator of the interference level and/or the level of concern. Some specific examples of the generated output are discussed herein, but methods are not limited to these specific examples.

The output may comprise a visual and/or audio indication generated by the controller 106. For example, the controller may include one or more lights, speakers, or output devices for generating the output. The output may comprise data transmitted to the host computing device 101.

Any suitable output to provide an indication of the interference level may be implemented. For example, the output may comprise a flashing LED (or other light source) where the color and/or frequency of flashing indicates the interference level. The interference level may be quantified in terms of the range from "clean" (close to zero detectable interference), to the touch sensor system's "touch threshold" level, to beyond the touch threshold level. The "touch threshold" level may be the level that can just barely trigger a false touch report. A "clean threshold" may be a lower interference threshold than the "touch threshold," and the "clean threshold" may refer to a sufficiently low interference level that interference is considered negligible. The "touch threshold" and "clean threshold" may be: predetermined for a given touch panel (e.g. as a factory setting); determined empirically by the controller; and/or set by a user such as a technician, to name a few examples. The method of indicating of where measured interference fits in that range may vary.

Consolidating measured interference into a simple numeric value and providing a simple indication of safety level, as a function of that value, may make it easier for a technician to exercise sound judgement and make appropriate integration decisions.

The steps of blocks 303, 304 and 308 may be repeated for the duration of the interference indication mode of operation. The controller 106 may operate in a repeating cycle measuring the interference level, indicating the measured level, then repeating.

Figure 4:
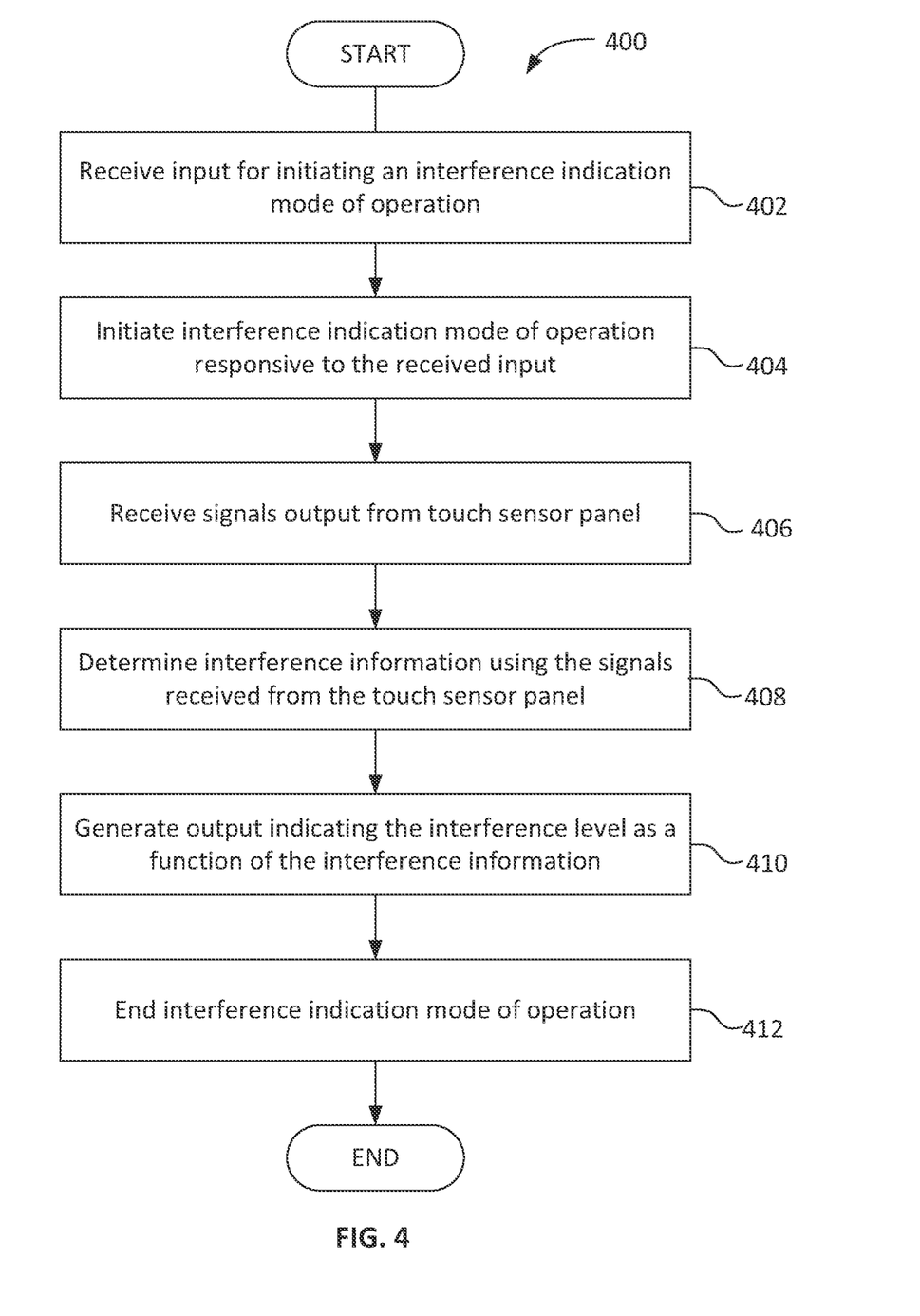
FIG. 4 is a flow diagram of another example method that may be performed by a touch sensor controller according to some embodiments.

FIG. 4 is another flowchart of an example method 400 that may be performed by a touch sensor controller. The method 400 is described below as performed by the controller 106 in the system 100. However, embodiments are not limited to the particular system 100 or touch sensor controller 106 of FIG. 1. Prior to starting the method 400, the controller 106 may be operating in a "normal mode of operation" in which the controller 106 generates touch information using signals received from the touch sensor panel 104. The touch information may be reported to the host computing device 101 in the normal mode of operation.

At block 402, the controller 106 receives input (e.g. user input) for initiating an interference indication mode of operation. The input may be received from the host computing device 101, the touch sensor panel, or via an input device of the controller 106 itself. As one example, the controller 106 may comprise a button, and the input may be provided by holding the button. The input may be a touch pattern received via the touch sensor panel. The pattern may comprise one or more touch locations held for a particular duration and/or at a particular time (e.g. as power is applied). The pattern may be a somewhat complex pattern held for a significant duration (e.g., four touches held for 30 seconds). Measures may be taken to help prevent inadvertent or unwanted activation of the interference indication mode or operation, or so that the system defaults back to normal operation automatically (e.g., a 'time out' function if action isn't taken by the user for a duration). Such measures may be particularly beneficial for public-use touch sensor systems. Embodiments are not limited to any particular manner of receiving the input or the form of the input required to initiate the interference indication mode of operation.

At block 404, the controller 106 initiates the interference indication mode of operation responsive to the input received at block 402. In some embodiments, the controller may generate output indicating that the interference indication mode of operation has started. This output may comprise visual or audio output, which may be provided by a visual and/or audio output device of the controller. Alternatively, the output may be an output signal to another device, such as the host computing device 101.

In the interference indication mode of operation, the controller 106 may, optionally, cease generating touch location information. In some embodiments, where touch the controller 106 does not inform the host computing device 101 that its touch-location function is disabled, so the host computing device 101 keeps functioning as before. Beneficially, ceasing reporting of touch information during the interference indication mode of operation may allow a technician to subject the touch sensor system to various sources and levels of interference without triggering a false touch (or touches). This may assist with testing the system for interference resistance and/or configuring the system.

In other embodiments, the controller 106 may automatically initiate the interference indication mode of operation upon occurrence of a triggering event other than user input. For example, the controller 106 may automatically initiate the interference indication mode of operation upon controller start-up, or upon detecting a connection to new hardware (e.g. host computer, touch sensor panel, or display). In still other embodiments, the interference determination and/or indication functionality described herein may be performed together with generation and reporting of touch information in the controller's normal mode of operation.

At block 406, the controller 106 receives signals output from the touch sensor panel 104 (similar to block 302 of FIG. 3).

At block 408, the controller 106 determines interference information using the signals received from the touch sensor panel 104 (similar to block 304 of FIG. 3).

At block 410, the controller 106 generates an output indicating the interference level as a function of the interference information (similar to block 306 of FIG. 3).

At block 412, the interference indication mode of operation ends and the controller 106 may return to the normal mode of operation. The termination of the interference indication mode of operation may be triggered by receipt of second input (e.g. user input) for returning to normal operation. By way of example, a button (potentially the same button that initiates the interference mode of operation) can be held for a minimum duration (e.g. several seconds). A visual and/or audio output may indicate that the interference mode of operation has ended. For example, an LED may flash in a manner or color indicating interference the level stopped. As another option, the controller power can be disconnected and reconnected (without user input) to stop the interference indication mode of operation. Some examples of optional inputs to resume normal operation may include: a button press; detecting multiple touches after a minimum duration of time with no false touches detected; power cycling of the touch sensor system; and/or a time out of no input for a duration. Embodiments are not limited to a particular input method.

Some examples of steps that the controller 106 may perform to determine interference information will now be described. These example algorithms may be used in block 304 of FIG. 3 or block 406 of FIG. 4 or similar methods.

Figure 5:
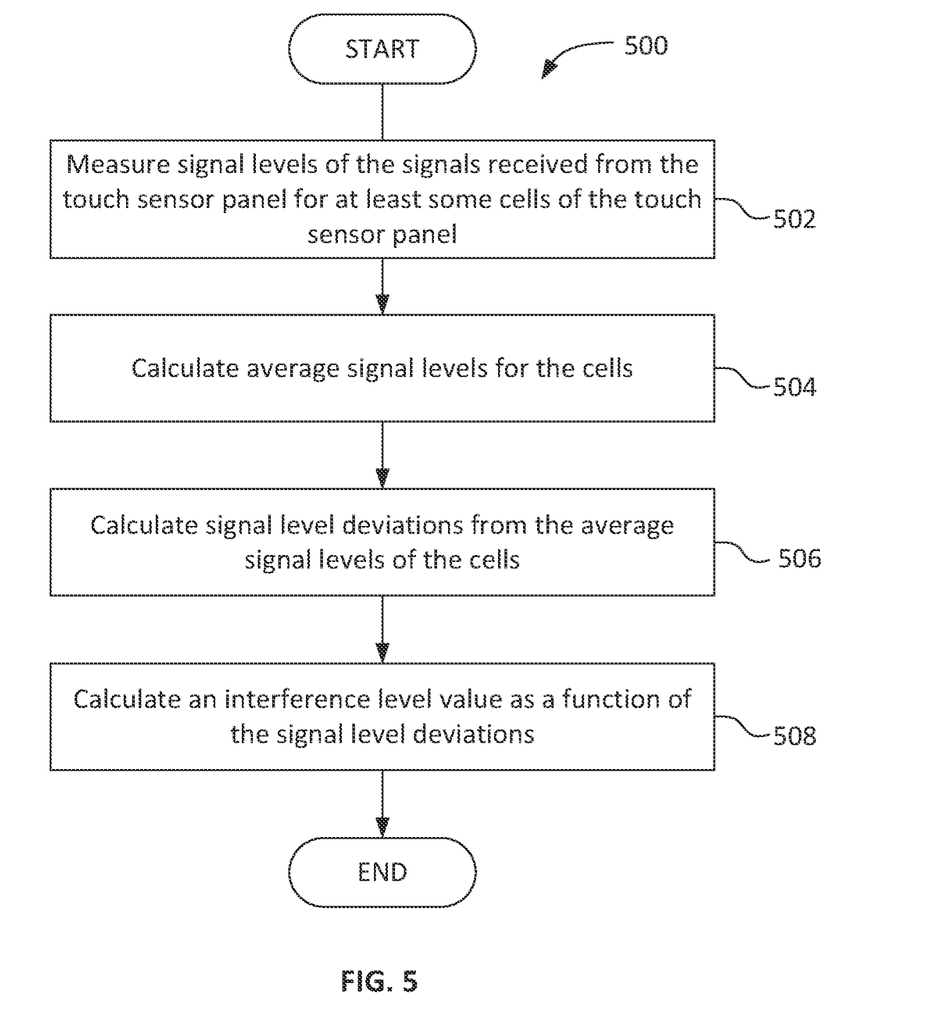
FIG. 5 is a flow diagram illustrating an example method of determining interference information according to some embodiments.

FIG. 5 is a flowchart of an example method 500 for determining interference information. This method 500 may be performed for block 304 of FIG. 3, or block 408 of FIG. 4 to quantify interference as a value. The method 500 is described below as performed by the controller 106 in the system 100. However, embodiments are not limited to the particular system 100 or touch sensor controller 106 of FIG. 1.

At block 502, the controller 106 measures signal levels of the signals received from the touch sensor panel 104 for at least some of the cells of the touch sensor panel 104. Signal levels may be measured for each of the cells of the touch sensor panel 104. The signal levels may be measured for all cells of the touch panel. The signal levels may be measured over a measurement period of multiple frame reads or scans. In other words, samples of the signals from the touch sensor panel may be taken and analyzed over an extended period of time.

At block 504, average signal levels for the cells are calculated. For each cell, a respective average signal level of the received signals corresponding to the cell may be calculated.

The steps of blocks 502 and 504 may be performed concurrently and/or continuously during the interference indication mode of operation, for example.

At block 506, signal level deviations from the average signal levels of the cells are calculated. In some embodiments, a respective signal level deviation is calculated for each of the cells, by comparing signal levels of the received signals for that cell to the corresponding average signal level for that cell. Signal levels of samples of the received signals may be compared to the average signal level for all samples for that cell.

At block 508, an interference level value is calculated as a function of the signal level deviations. In some embodiments, this step comprises selecting the largest or maximum deviation of the signal level deviations for all cells, and determining the interference level value as a function of that largest deviation. In other words, the interference level may be calculated from the maximum single deviation of all measurements of all cells during the measurement period (frame reads) that signal levels were measured. Thus, the cell showing the most deviation in signal levels may be used to determine the interference level for the touch sensor panel 104.

In other embodiments, average signal levels may be calculated for multiple cells (i.e. groups of cells) rather than on a per-cell basis. Similarly, more deviations of groups of cells may be compared to identify the group of cells that collectively have the largest deviations. The interference level may be determined as a function of the collective deviations of that group.

The number of frame reads in which signal samples are collected to calculate an interference level may vary. Increasing the number of frame samples collected will increase the time required to generate the interference information. It may be desirable to limit the time required to generate the interference information so that an indication of the interference may be provided in a responsive manner. A simple algorithm based on a low number of frame reads may be sufficient in some applications for at least a few reasons: (1) touch screens are typically designed so that the cells are as alike as possible; (2) even just a few frame reads may yield considerable statistical data because sensors typically have hundreds of cells; and (3) any interference source that is going to affect some cells beyond the level that triggers a false touch may reasonably be expected to also correspondingly strongly affect many cells.

The method 500 of FIG. 5 may further comprise comparing the largest deviation to the touch threshold. The method may comprise determining whether the largest deviation exceeds the touch threshold, as discussed above.

Figure 6A:
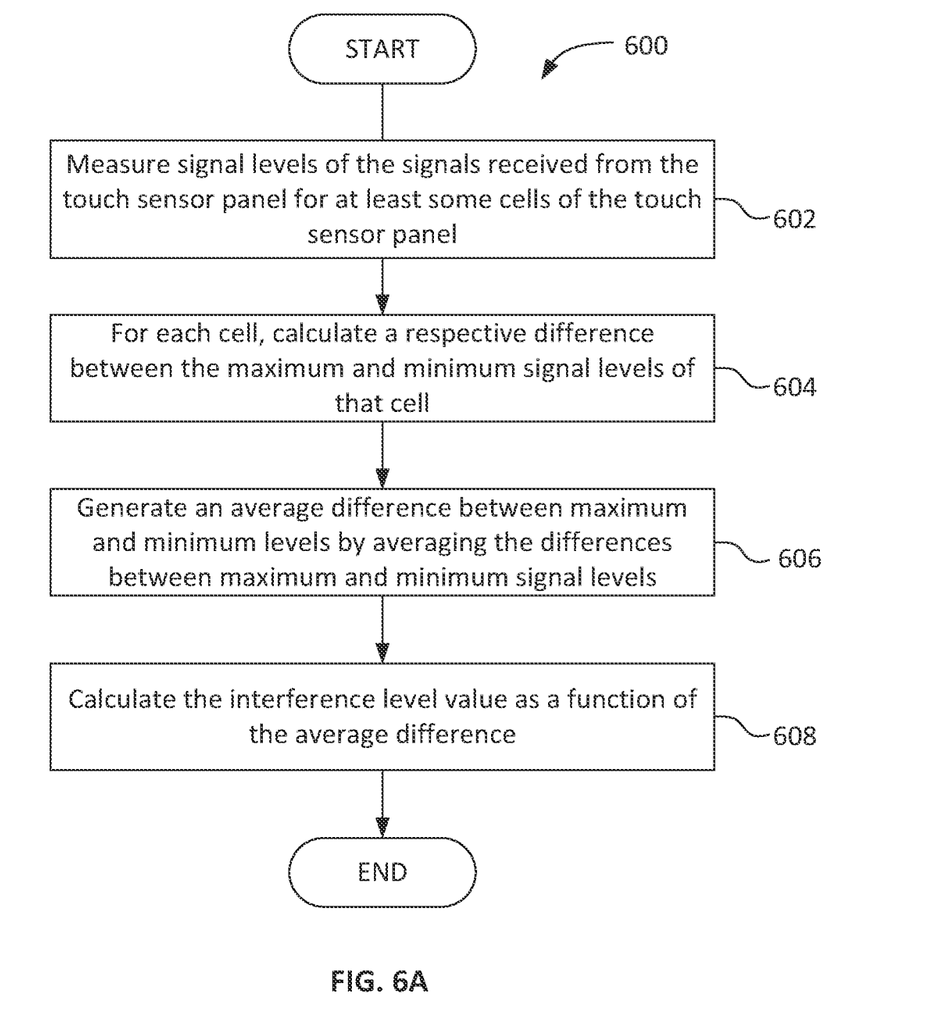
FIGS. 6A and 6B are flow diagrams illustrating further example methods of determining interference information according to some embodiments.

FIG. 6A is a flowchart of an example method 600 for determining interference information. This method 600 may be performed for block 304 of FIG. 3, or block 408 of FIG. 4 to quantify interference as a value. The method 500 is described below as performed by the controller 106 in the system 100. However, embodiments are not limited to the particular system 100 or touch sensor controller 106 of FIG. 1.

At block 602, the controller 106 measures signal levels of the signals received from the touch sensor panel 104 for at least some of the cells of the touch sensor panel 104. Signal levels may be measured for each of the cells of the touch sensor panel 104. The signal levels may be measured for all cells of the touch panel. The signal levels may be measured over a measurement period of multiple frame reads or scans.

At block 604, for each cell, a respective signal level difference between the maximum and minimum signal level measured for the that cell is calculated. This difference may be referred to herein as "$\text{Diff}_{max\text{-}min}$". Optionally, a standard deviation of all the signal level measurements for the cells may be measured.

At block 606, the differences, $\text{Diff}_{max\text{-}min}$, between maximum and minimum signal levels for the cells are averaged, thereby generating an average difference between maximum and minimum levels.

At block 608, the interference level value is calculated as a function of this average difference generated at block 606.

This method 600 of FIG. 6A may be computationally simple and quick. The method 600 may optionally include applying a compensation factor to the average difference calculated at block 606, so that results from different sensor sizes may be comparable.

In embodiments where a standard deviation is measured of all signal measurements, the standard deviation may be calculated from all sets of frame reads and all cells within each read. The measurement values from which standard deviation is calculated may, preferably, be the deviations of each cell signal from the average for that cell from all the frame reads. This way, each cell is considered against its own baseline level. This may have the result that normal variations in baseline signal level over the cells don't contribute (or contribute as much) to the standard deviation calculation meant to indicate the presence of interference.

Alternatively, rather than averaging signal differences for all cells of the touch sensor panel 104, only a subset of cells may be used to generate the interference level value. For example, only the cells that are determined as being most strongly affected (i.e. assessing the worst-case cells) may be used in the averaging because these cells may be the most likely to generate the false touches. In some embodiments, the interference level may be calculated, as a function of a difference between previously known or calculated base value level for each cell and the peak/maximum of a small set of cells that have the largest deviations from their respective base levels. The base value may be a long-term signal level average. The set of cells may be chosen based on multiple frame reads. Other algorithms for quantifying an interference level value that may be indicative of risk of false touches may be used in other embodiments.

Figure 6B:
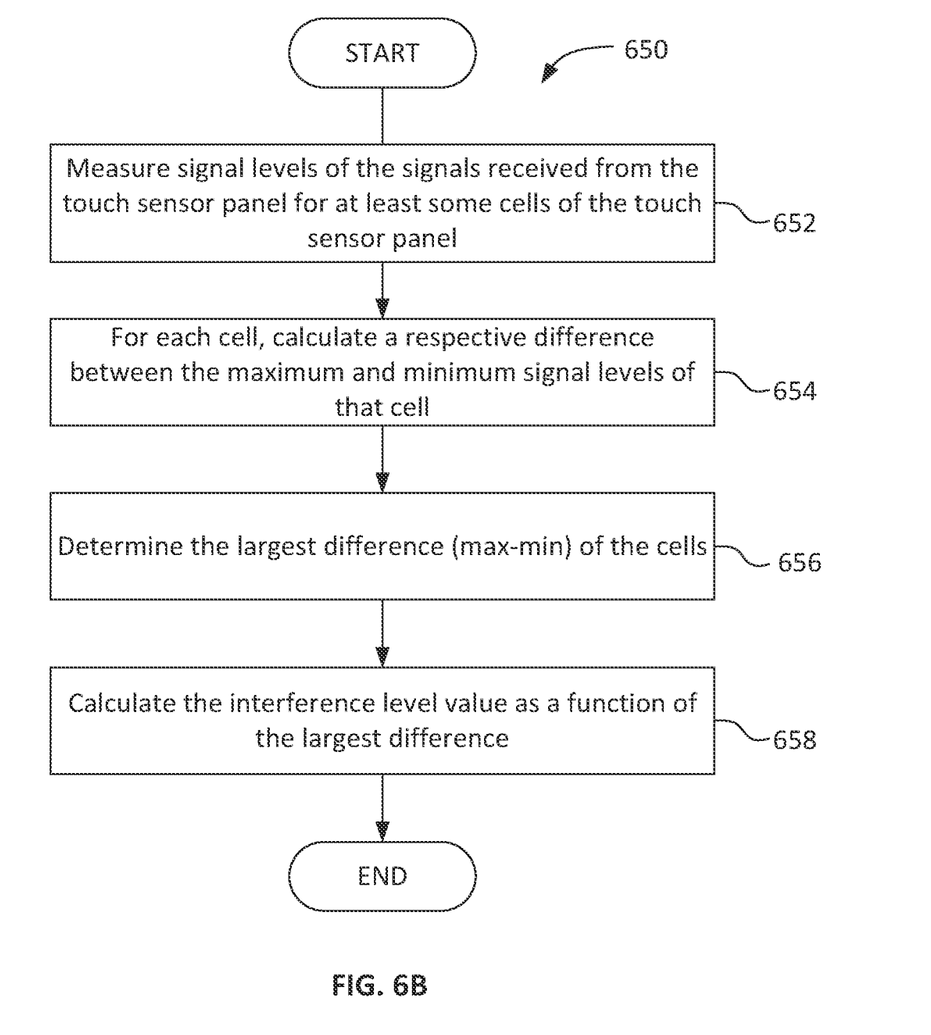

FIG. 6B is a flowchart of another alternate method 650 for determining interference information, which is a variation of the method 600 of FIG. 6A.

At block 652, the controller 106 measures signal levels of the signals received from the touch sensor panel 104 for at least some of the cells of the touch sensor panel 104. Signal levels may be measured for each of the cells of the touch sensor panel 104. The signal levels may be measured for all cells of the touch panel. The signal levels may be measured over a measurement period of multiple frame reads or scans.

At block 654, for each cell, the respective difference between the maximum and minimum signal level, $\text{Diff}_{max\text{-}min}$, for the cell is calculated.

At block 656, the largest difference $\text{Diff}_{max\text{-}min}$ of any of the cells over the measurement period is determined.

At block 658, the interference level value is calculated as a function of this largest difference generated at block 656.

During interference testing, a series of signals levels may be obtained from all touch sensor cells and identify the sensor that has the largest deviation from the "clean threshold" toward the "touch threshold". The measurement or set of measurements may be processed in a way that helps ensure that the result determines the interference signal as a fair comparison to the level required to reach the real touch threshold of the system. For example, determining that the interference level exceeds the "touch threshold" may be require that a measured signal level persists for some minimum duration. In that case, the acquired interference measurements may be taken over a period that reflects at least a similar duration. It may be preferrable that the algorithm for determining the interference level is similar to or mimics as close as practical the algorithm that the PCAP control circuitry uses to measure sensor signals and determine whether a touch should be reported.

Some specific examples of visual output that may be provided using one or more LEDs of the controller will now be described. However, methods of indicating interference levels may vary and embodiments are not limited to these examples. Color, number, duration, or frequency of flashes may vary. Other embodiments may use different method to provide visual feedback. Audio indications may be used together with or in place of visual feedback.

As one example, the LED may emit a number of flashes, where different numbers of flashes and/or colors of the flashes correspond to different interference levels. Each flash in a first color (e.g. green) may correspond to a step of a range (e.g. 5% steps). Additional flashes or another color may be used if the measured interference exceeds the 'touch threshold' level. A mix of different colored flashes may also be used to indicate different levels in the range (or exceeding the range).

As another example, the LED (or LEDs) may flash constantly, but with duration of LED "on" time varying according to interference level. A green LED may flash slowly, with "on" duration decreasing as the measured interference increases. At a threshold, the green LED may cease flashing, and red LED may flash, with an increasing "on" duration as measured interference increases. At a certain upper threshold, the red LED may stay illuminated constantly. As yet another example, red and green LEDs may be flashed so quickly that their duty cycles are only perceivable as light intensity, and intensity may provide an indication of measured interference. With increasing interference level the duty cycle of the green LED may fall, and the duty cycle of the red LED may rise. Audio cues such as traditional beep indications (of variable frequency, pitch, and/or volume) may also be used.

As yet another example, during normal operation, the LED may stay illuminated in a particular color that indicates normal operation (e.g. blue). Then, upon initiation of the interference indication mode of operation (e.g. block 404 of FIG. 4), the LED may be flashed red once. While the interference indicator is collecting and analyzing frame data (blocks 406 and 408 of FIG. 4), the blue LED is illuminated. Once the analysis is complete, the blue LED may be turned off and the output provided (block 410 of FIG. 4). Safe interference that is below a threshold may be indicated with a green LED. A dangerous level of interference may be indicated with a flashing red LED. The number of flashes may vary, and may be, for example, 1 to 15 flashes. The number of flashes may indicate a severity of the interference. Optionally, green and/or yellow flashes may also be used to indicate varying levels of "safety".

A "safe threshold" for interference may be set for the controller. The "safe threshold" may be maximum level of interference that a technician (or other user) finds acceptable based on previous experience. The technician may determine that a given interference severity level is an acceptable trade-off between the risk of false touches and some other aspect of the system.

The methods described herein may further comprise maintaining a connection between the controller and the host computing device and/or suppressing reporting of touches by the controller. For example, the controller can be used to put the host computing device into a particular state (e.g. one that the technician wants to test for interference), and then the controller may be switched to the interference indication mode of operation. In this way, the host computing device may not be aware of the controller change in mode of operation, but may simply not receive reports of touch locations (as is normal any time the sensor isn't being touched). In some embodiments, the interference indication mode of operation may be activated periodically or on demand, with the touch sensor system otherwise running in the normal mode of operation. When activated, the interference indication mode of operation may report interference measurements or may simply save the measurements for reporting later. The touch sensor system can be fully sealed, with the technician still able to exercise all of its functions conveniently using the touch screen, with the possible exception of lost touch detection operation for brief periods while measurements are taken. This period of touch detection loss may be very brief. The results of interference measurements taken during normal operation may, in some embodiments, be used automatically by the controller (or host) to adapt touch sensor system settings to maintain effective or optimal operation of the touch sensor as interference conditions change. Adapting the touch sensor system settings may include, for example, adjusting thresholds and/or gain/sensitivity. Other touch sensor system settings may also be adjusted.

Figure 7:
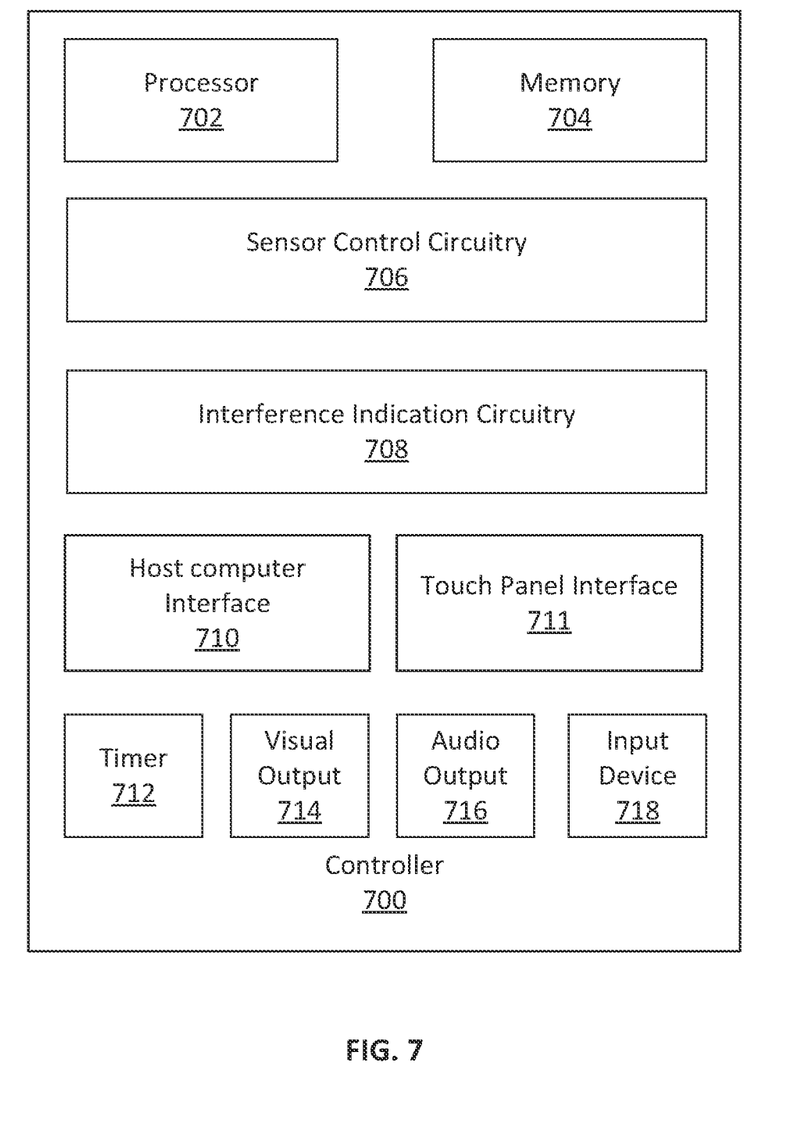
FIG. 7 is a block diagram of an example controller that may implement the methods of FIG. 3 to 6 according to some embodiments.

FIG. 7 is a block diagram of an example controller 700. The controller 106 of FIG. 1 may be in the form shown in FIG. 7, for example. The controller 700 may implement one or more of the methods of FIGS. 4 to 6.

The controller 700 comprises: a processor 702 and memory 704 storing processor-executable instructions for execution by the processor 702. The processor 702 and memory 704 may implement and/or control functionality of the controller 700. The controller 700 further comprises control circuitry 706 that is configured to control a touch sensor panel (such as the touch sensor panel 104 in FIG. 1) and to process information received from the touch sensor to generate touch information. The controller 700 optionally further comprises interference indication circuitry 708, a host computing device interface 710, and a touch sensor panel interface 711.

The control circuitry 706 performs operations including: outputting drive signals to the touch sensor panel and receiving response signals from the touch sensor panel. The control circuitry is further operable to generate touch information from the response signals.

The interference indication circuitry performs operations including: determining interference information using the response signals received from the touch sensor panel, comprising analyzing signal levels of the signals received from the touch sensor panel; and generating an output indicative of the interference information. The interference indication circuitry 708 may implement the methods described herein, including the methods 300, 400, 500 and/or 600 of any of FIGS. 3 to 6. Implementing these methods may comprises controlling other components of the controller 700, including the control circuitry 706. The processor 702 and memory 704 may implement the interference indication circuitry 708. In some embodiments, the control circuitry 706 and interference indication circuitry 708 may share the processor 702 and/or memory 704. The processor 702 and memory 704 may also implement other components of the controller 700. Any combination of hardware and software (e.g. firmware) may be used to provide the functionality of the controller 700 or other controller embodiments described herein.

The host computing device interface 710 may be operable for communication with a host computing device (such as host computing device 101 in FIG. 1) to communicate touch information and possibly other information to the host computing device. The host computing device interface 710 may comprise at least one wired communication port for connecting to the host computing device. The wired connection may be a Universal Serial Bus (USB) connection, and the host computing device interface 710 may, thus, comprise one or more USB ports, as one example. The host computing device interface 710 may also include a wireless communication receiver and/or transmitter for wireless communication with the host computing device. The wireless communication may be via Bluetooth or any other suitable wireless communication protocol.

The touch sensor panel interface 711 may be any interface operable for coupling (via a bus or other connection) to a touch sensor panel. The touch sensor panel interface 77 may include a flex tail connection port, for example.

The controller 700 in this example may also include one or more of the following optional components: a timer 712 that may be used to determine whether an input has satisfied a minimum duration threshold; a visual output device 714 for providing visual indicator output (e.g. one or more LEDs); an audio output device 716 for providing audio indicator output (e.g. speaker); and/or an input device 718 (e.g. button) for receiving input, such as input to initiate and/or exit the interference indication mode of operation. In some embodiments, the controller may include driver firmware for controlling audio/visual indicators. The visual output device 714 and audio output device 716 may be external to and/or remote from the controller 700. Other components may also be included.

Optionally, the controller may include functionality for receiving input to trigger interference measurement from an external device (e.g. via wireless signalling such as Bluetooth, an input/output pin). In such configurations, the controller may not include a button or other physical input means for receiving input to activate the interference mode of operation. Interference indicating output may also be provided by wired or wireless connection, rather than via audio or visual output.

The interference indication circuitry 708 may implement the method of FIG. 2 by controlling other components of the controller 700, including the sensor control circuitry 706, the host computing device interface 710, the touch sensor panel interface 711, and/or other components. The interference indication circuitry 708 may be operable to receive the first input for initiating the interference indication mode of operation; initiate the interference indication mode of operation responsive to the input; analyze signal levels of signals received from the touch sensor to determine interference level information; and generating an output indicative of the interference level information. The interference indication circuitry 708 may also implement other functions described herein including, but not limited to, providing visual and/or audio indications (e.g. by controlling the visual output device 714 and the audio output device 716); receiving input to exit the interference indication mode of operation; exiting the interference indication mode of operation and potentially resuming normal operation accordingly; and other functions described herein.

In some embodiments, the controller 700 may also monitor the self capacitance of the X and Y electrode channels of the touch sensor panel (e.g. touch sensor panel 104 of FIG. 1). The touch sensor panel may be a PCAP touch sensor panel. In some embodiments, the controller 700 may be configured to be operational for controlling the touch sensor panel using both a mutual-capacitance method and a self-capacitance method. The controller 700 may be functional to determine and report interference levels for both types of PCAP sensor monitoring (mutual-capacitance and self-capacitance). In some embodiments, the worse of the two interference measurements (mutual-capacitance and self-capacitance) may be reported.

The controller 700 may optionally report measured interference levels to the host computing device (e.g. host computing device 101 of FIG. 1) using a wired or wireless link. In the case of a wired link, the wired link might be a separate physical link from a link used to report touch locations, of the wired link may use the same physical link as touch location reporting, but with a separate virtual connection. As an example of the latter, a touch sensor system that reports touch locations via USB could establish its USB link with the host computing device as both a touch sensor system and as another USB device which reports interference levels. As another example, a touch sensor system might report touch locations to its host computing device via the "I2C" serial communication protocol, using messages with a given format or protocol to report touch locations and a different format or protocol to report interference levels.

One or more of the components of the controller 700 may be omitted, combined with other components, or omitted in other embodiments. This disclosure is not limited to the particular controller 700 shown.

It is to be understood that a combination of more than one of the approaches described above may be implemented. Embodiments are not limited to any particular one or more of the approaches, methods or apparatuses disclosed herein. One skilled in the art will appreciate that variations or alterations of the embodiments described herein may be made in various implementations without departing from the scope of the claims.

What is claimed is:

1. A method for indication of an interference level by a touch sensor controller coupled to a touch sensor panel, the touch sensor controller comprising an audio or visual output device, the method comprising:

outputting, by the touch sensor controller, drive signals to the touch sensor panel;

receiving, by the touch sensor controller, response signals output from the touch sensor panel;

determining, by the touch sensor controller, an interference level using the signals received from the touch sensor panel, comprising analyzing signal levels of the response signals received from the touch sensor panel; and generating, by the audio or visual output device of the touch sensor controller, an audio or visual output that indicates the interference level, wherein the touch sensor controller is connectable to a host computing device that receives touch information from the touch sensor controller and controls a display as a function of the received touch information, wherein the audio or visual output device of the touch sensor controller is separate from the host computing device and the display.

2. The method of claim 1, wherein the interference level comprises a quantified interference level value, and the output that indicates the interference level is generated as a function of the quantified interference level value.

3. The method of claim 2, wherein determining the quantified interference level value comprises measuring, for a plurality of cells of the touch sensor panel, the signal levels of the signals received from the touch sensor panel.

4. The method of claim 3, wherein determining the quantified interference level value further comprises, calculating, for each cell of the plurality of cells, a respective average signal level.

5. The method of claim 4, wherein determining the quantified interference level value further comprises, calculating, for each cell of the plurality of cells, respective signal level deviations from the respective average signal level.

6. The method of claim 5, wherein determining the quantified interference level value further comprises identifying a largest signal level deviation of the signal level deviations of the cells, and generating the quantified interference level value as a function of largest signal level deviation.

7. The method of claim 2, wherein determining the quantified interference level value comprises measuring differences between maximum and minimum signal levels measured for at least some of a plurality of cells of the touch sensor.

8. The method of claim 7, wherein determining the quantified interference level value comprises generating the quantified interference level value as a function of the differences between the maximum and minimum signal levels.

9. The method of claim 1, further comprising initiating an interference indication mode of operation.

10. The method of claim 9, wherein the method further comprises suppressing reporting of touch information during the indication mode of operation.

11. The method of claim 9, further comprising: receiving first input, and wherein initiating the interference indication mode of operation comprises initiating the interference indication mode of operation responsive to the first input.

12. The method of claim 11, further comprising receiving second input, and ceasing the interference indication mode of operation responsive to the second input.

13. The method of claim 2, wherein the quantified interference level value comprises a quantized interference level value.

14. A touch sensor system comprising:
a touch sensor panel;
a controller coupled to the touch sensor panel, the controller comprising an audio or visual output device and operable to:
output drive signals to the touch sensor panel and receive signals output from the touch sensor panel;
determine an interference level using the signals received from the touch sensor panel, comprising analyzing signal levels of the signals received from the touch sensor panel; and
generate, by the audio or visual output device of the controller, an audio or visual output that indicates the interference level, wherein the controller is connectable to a host computing device that receives touch information from the controller and controls a display as a function of the received touch information, wherein the audio or visual output device of the controller is separate from the host computing device and the display.

15. A controller for a touch sensor system comprising a touch sensor panel, the controller comprising:
touch panel control circuitry that performs operations comprising outputting drive signals to the touch sensor panel and receiving response signals output from the touch sensor panel;
interference indication circuitry that performs operations comprising:
determining an interference level using the response signals received from the touch sensor panel, comprising analyzing signal levels of the signals received from the touch sensor panel; and
an audio or visual output device that generates an audio or visual output that indicates the interference level, wherein the controller is connectable to a host computing device that receives touch information from the controller and controls a display as a function of the received touch information, wherein the audio or visual output device of the controller is separate from the host computing device and the display.

16. The controller of claim 15, wherein the interference level comprises a quantified interference level value, and the output that indicates the interference level is generated as a function of the quantified interference level value.

17. The controller of claim 16, wherein determining the quantified interference level value comprises:
measuring, for a plurality of cells of the touch sensor panel, the signal levels of the signals received from the touch sensor panel;
calculating, for each cell of the plurality of cells, a respective average signal level; and
calculating, for each cell of the plurality of cells, respective signal level deviations from the respective average signal level.

18. The controller of claim 17, wherein determining the quantified interference level value further comprises identifying a largest signal level deviation of the signal level deviations of the cells, and generating the quantified interference level value as a function of largest signal level deviation.

19. The controller of claim 15, wherein the interference indication circuitry further initiates an interference indication mode of operation, and wherein the control circuitry suppresses reporting of touch information during the indication mode of operation.

20. The controller of claim 16, wherein the quantified interference level value comprises a quantized interference level value.

* * * * *